W. MAYNARD.
LIQUID-FILTER.
No. 184,093. Patented Nov. 7, 1876.
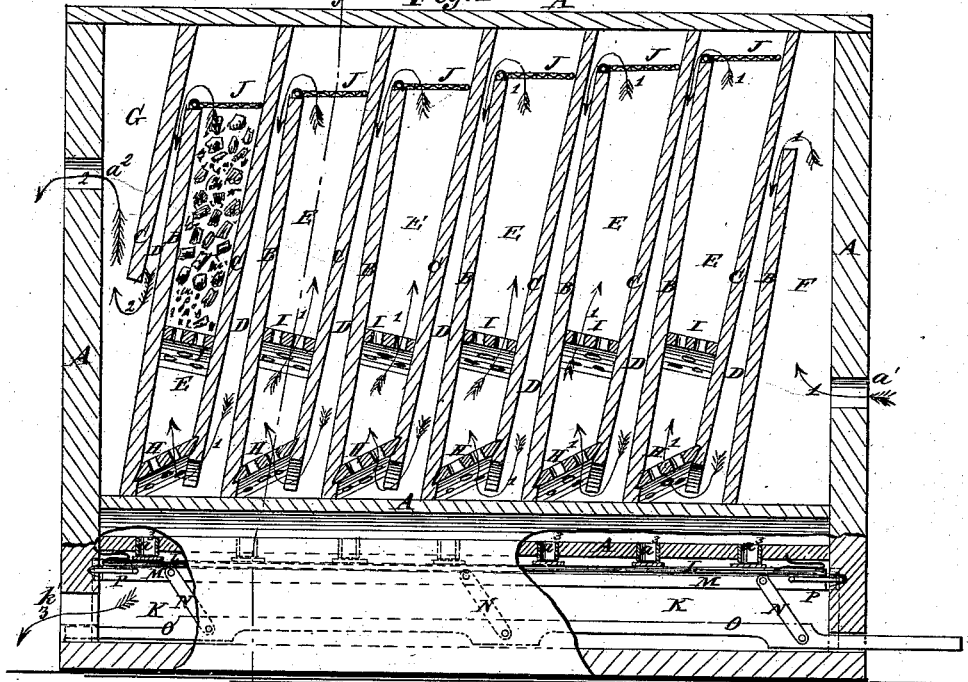
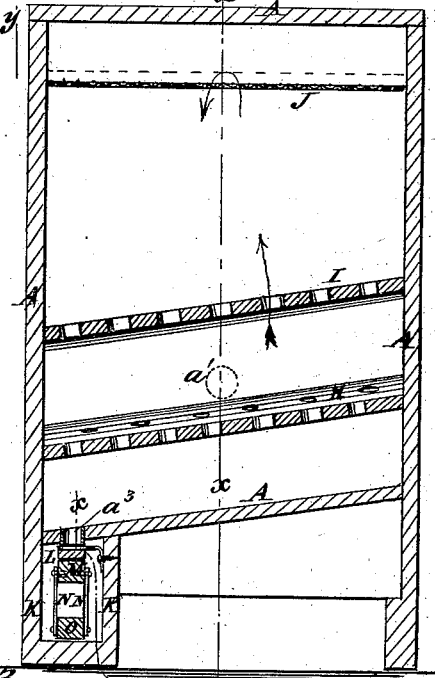
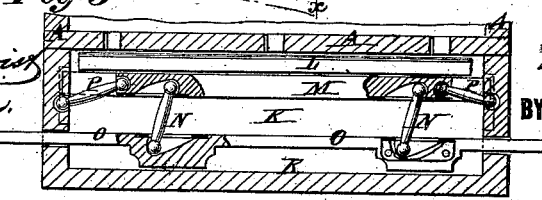
WITNESSES:
A. W. Almquist
Frank Blockley
INVENTOR:
W. Maynard
BY
Munn
ATTORNEYS.

UNITED STATES PATENT OFFICE.

WILLIAM MAYNARD, OF NEW YORK, N. Y.

IMPROVEMENT IN LIQUID-FILTERS.

Specification forming part of Letters Patent No. 184,093, dated November 7, 1876; application filed October 14, 1876.

*To all whom it may concern:*

Be it known that I, WILLIAM MAYNARD, of the city, county, and State of New York, have invented a new and useful Improvement in Liquid-Filters, of which the following is a specification:

Figure 1 is a vertical longitudinal section of my improved filter, taken through the line $x\,x$, Fig. 2, parts being broken away to show the construction. Fig. 2 is a cross-section of the same taken through the line $y\,y$, Fig. 1. Fig. 3 is a detail view, showing a modification of the same.

Similar letters of reference indicate corresponding parts.

The object of this invention is to furnish an improved device for filtering water and other liquids, which shall be so constructed as to thoroughly filter the liquid, and enable the collected refuse to be readily removed from the filter, when desired.

The invention consists in an improved filter formed by the combination of the partitions and the screens with each other and with the case to form a series of filtering and conducting spaces for the passage of the liquid, and in the combination of the three bars, the pivoted connecting-bars, and the pivoted guide-bars with the perforated bottom of the case, and with the chamber connected with the said case, as hereinafter fully described.

A is the box or case of the filter, which is made rectangular in form, and of any desired size. The bottom of the box A inclines toward one side, and the space above said bottom is divided into a number of compartments by a number of pairs of partitions, B C. The partitions B C of each pair are inclined at their upper ends toward the inlet end of the box A, and their upper parts are a little closer together than their lower parts. This makes the spaces D between the partitions of each pair narrower in their upper parts, and the spaces E between the pairs of partitions narrower in their lower parts.

The partitions B extend from the bottom of the box A nearly to its top, and the partitions C extend from the top of the box A nearly to its bottom, as shown in Fig. 1. This construction leaves a space, F, at the inlet end of the filter narrower at its top than at its bottom, and a space, G, at the outlet end of the filter wider at its top than at its bottom.

In the lower part of each of the spaces E, and at a little distance from each other, are placed two partitions or false bottoms, H I, one or both of which are detachable. The partitions H I are inclined longitudinally, so as to be parallel with the bottom of the case A, or nearly so, and the lower partitions H are also inclined laterally toward the outlet ends of the said case A.

In the lower part of the end of the case A is formed the inlet-opening $a^1$, and in the upper part of the other end of said case A is formed the outlet-opening $a^2$. In the spaces E, above the partitions I, is placed some suitable filtering material, such as charcoal, sand, pebbles, &c. The partitions H I are perforated, to allow the liquid to pass through. In the upper part of the spaces E, at the top edges of the partitions B, are placed wire-gauze screens J, to prevent the filtering material from being carried out of said spaces by and with the liquid.

With this construction the liquid is admitted through the inlet $a^1$, passes up through the space F, over the upper edge of the first partition B, down through the first space D, beneath the lower edge of the first partition C, up through the partitions H I, the filtering material, and the screen J in the first space E, over the upper edge of the next partition B, and so on through all the spaces of the filter, and escapes from the chamber G through the outlet-opening $a^2$.

In the lower part of the inclined bottom of the box A are formed a number of holes, $a^3$, leading into a chamber, K, formed beneath the said lower part of the said bottom, which openings are closed by a series of valves formed upon or attached to a bar, L, placed upon a bar, M, and hinged to the side of the chamber K, or left free, and which may be provided with springs to press it down, or not, as may be desired.

To the bar M are pivoted the upper ends of a number of bars, N, the lower ends of which are pivoted to another bar, O, that slides upon the bottom of the chamber K, so that, by sliding the bar O longitudinally in one direction, the bar M will be lowered, to allow the valve-bar L to drop down and uncover the holes $a^3$, and by moving the bar O in the other direction the bar M will be raised to press the valve-bar L up and close the holes $a^3$.

The bar M is kept from longitudinal movement while being raised and lowered by two bars, P, the inner ends of which are pivoted to the said bar M, and their outer ends are pivoted to the ends of the chamber K.

The ends of the bars N and P may be pivoted in their places by balls and sockets, as shown in Fig. 3, or in any other suitable way.

The sliding bar may be operated by a lever, a screw, or other convenient means.

In the side or end of the chamber K is formed an opening, $k'$, for the water to escape through.

With this construction, when the filter requires to be cleansed, the inflow of the liquid is stopped, and water is introduced through the outlet $a^2$, and the valve-bar L is lowered, so that the water may wash out all the refuse separated from the filtered liquid; or, if desired, the top of the box A may be removed, and the water introduced above the screens J, so that the same water may pass through only one of the filtering-chambers E. In this way the filter may be thoroughly cleansed without removing the filtering material.

Having thus described my invention, I claim as new and desire to secure by Letters Patent—

1. An improved filter, formed by the combination of the partitions B C and H I and the screens J with each other and with the case, to form a series of filtering and conducting spaces for the passage of the liquid, substantially as herein shown and described.

2. The combination of the bars L M O, the pivoted connecting-bars N, and the pivoted guide-bars P with the perforated bottom of the case A and with the chamber K, connected with the said case A, substantially as herein shown and described.

WILLIAM MAYNARD.

Witnesses:
JAMES T. GRAHAM,
C. SEDGWICK.